Sept. 10, 1963  J. A. RANSOHOFF  3,103,479
NUCLEAR REACTOR CONTROL RODS
Filed April 20, 1959  2 Sheets-Sheet 1
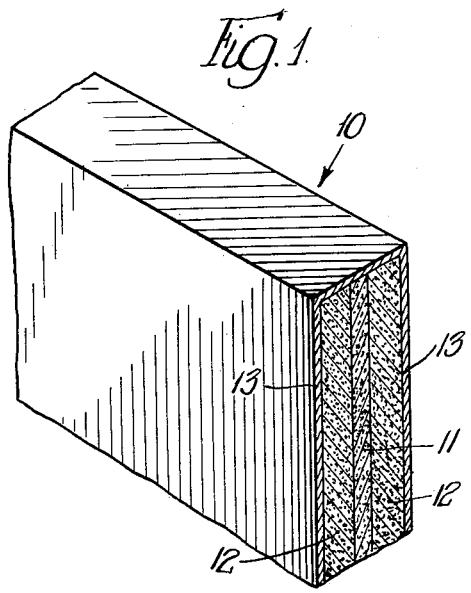
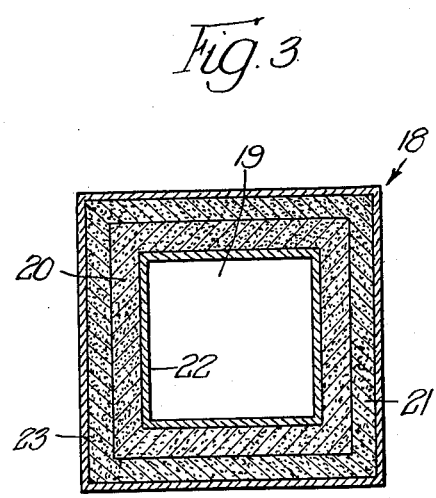
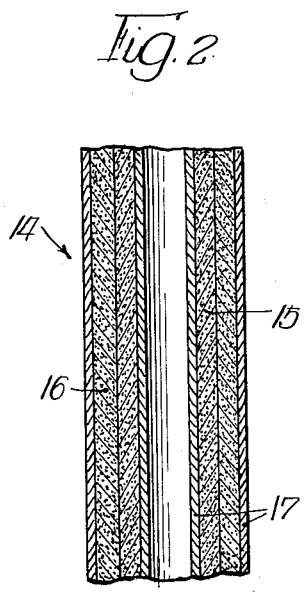
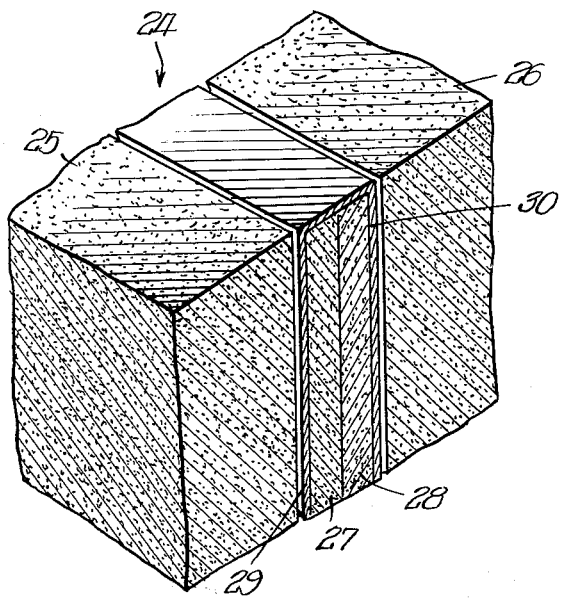
INVENTOR.
Jackson A. Ransohoff,
BY
Cromwell, Greist & Warden
Attys

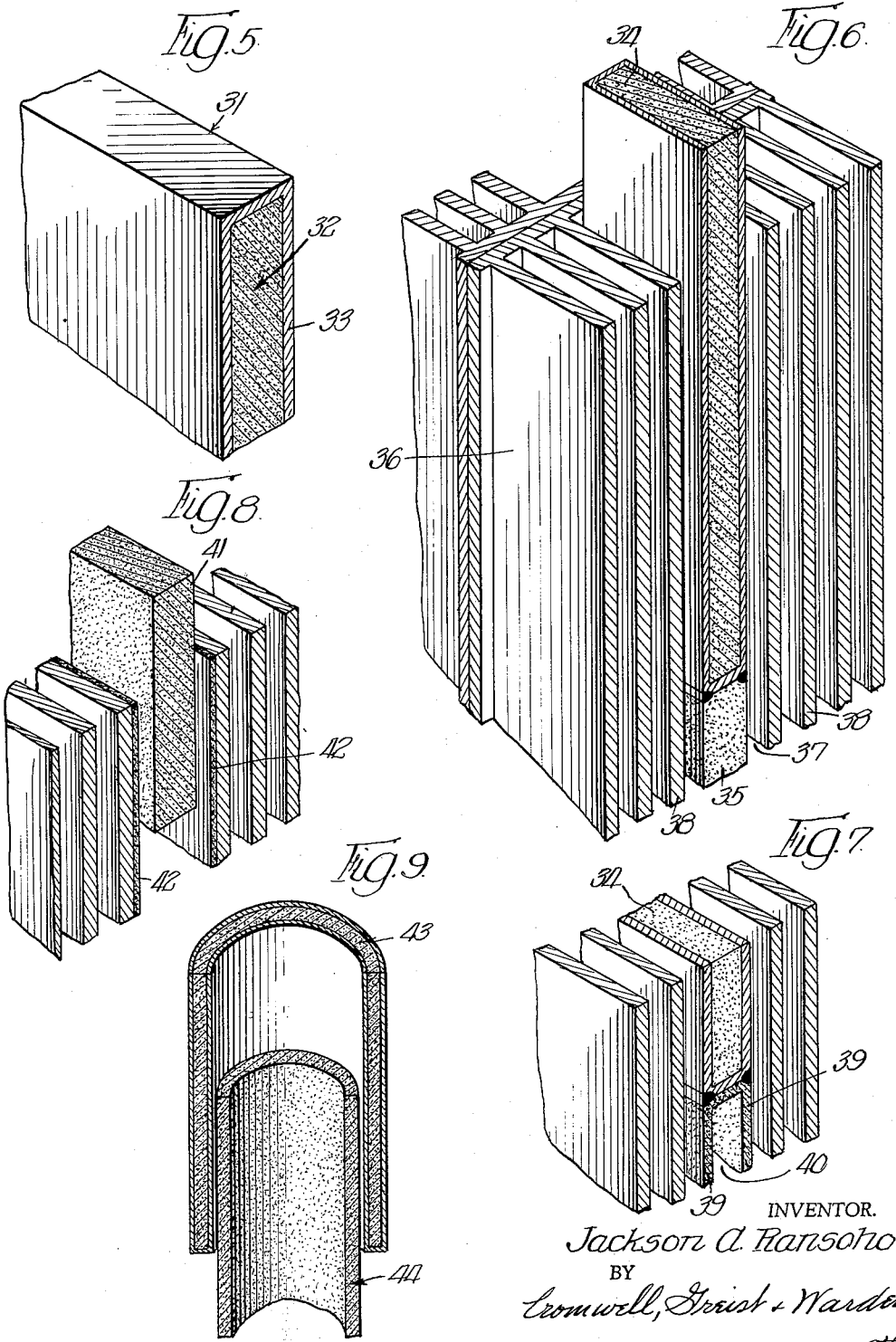

United States Patent Office 3,103,479
Patented Sept. 10, 1963

3,103,479
NUCLEAR REACTOR CONTROL RODS
Jackson A. Ransohoff, 734 15th St. NW.,
Washington 5, D.C.
Filed Apr. 20, 1959, Ser. No. 807,585
12 Claims. (Cl. 204—193.2)

The present invention relates to new and improved nuclear reactor control rod devices of laminated configuration providing for efficient utilization of neutron absorbing material in a manner to effectively increase the usefulness of such materials.

In line with accepted nuclear reactor control techniques, one or more control rods containing neutron absorbers are located in the reactor to adjust reactivity. These control rods are formed from neutron absorbing materials commonly referred to as "poison" capable of absorbing enough neutrons so that their movement would provide changes in reactivity as desired. Such control means while being referred to as "rods" may take many different configurations or shapes depending among other things, upon the control rod surface area required. For example, these "rods" are commonly in the form of plates having a portion thereof extending from the reactor to permit positional adjustment of the rods by movement thereof into and out of the pile to attain the requisite control. Such control means may also be in the form of crosses, box-like members, and solid or hollow cylinders. For purposes of describing the present invention, it will be understood that by referring to "control rods" it is intended to cover any suitable configuration as may be used in any type of nuclear reactor, the invention residing in the actual fabrication of or poison configuration in such rods and not being limited in any respect to the over-all configuration or shape of the rods.

The materials from which control rods are made must fulfill three general requirements: they must be structurally sound, they must be capable of absorbing a high enough percentage of neutrons to provide the control demanded of them, and they must absorb the requisite percentage of neutrons over a period of time adequate to give them satisfactory useful life. In addition, it may be desirable, where possible, to obtain a useful by-product from at least a portion of the neutrons absorbed.

In any thermal reactor, the neutron population consists of neutrons of a wide range of energies, varying from fission energy to somewhat below thermal. In some reactors, adequate control rod worth may be obtained simply by the absorption of thermal neutrons. In such cases, the factors of most importance in the selection of neutron absorbers are lifetime and cost. In determining lifetime, one must reckon the number of neutrons which can be absorbed by the rod before enough absorber is consumed so that an appreciable number of neutrons are passing through the rod without being captured. In some cases, a combination of materials, one which has a large number of absorbing atoms, and another which has fewer but more effective absorbing atoms, will make an economically optimum combination.

It is an object of the present invention to provide a control rod configuration including therein in combination a long-lived absorber and a highly effective absorber, the combination being such that the longer-lived absorber serves to protect the more effective absorber, thereby extending the effective lifetime of the rod.

In many reactors, control rods, to be of adequate worth, must absorb considerable epithermal neutrons as well as the thermal neutrons. This may be accomplished by the use of materials which are good epithermal neutron absorbers. However, most materials which are good epithermal neutron absorbers also have an affinity for thermal neutrons. In some cases, it is desirable to extend the lifetime of the epithermal absorber by protecting it from exposure to thermal neutrons in line with the teachings of the present invention.

It is a further object of this invention to provide a means of extending the usefulness of epithermal absorbers, or any desirable absorber which suffers serious radiation damage due to neutron absorption by shielding them from thermal neutrons with good thermal neutron absorbers.

Since the neutrons absorbed in control rods must be absorbed for the sake of reactor control, they are an attractive source of "free" neutrons to those who hope to irradiate something in a reactor to obtain a useful product. It is a superfluous requirement that such materials also be good neutron absorbers to the extent required by control rods.

Another object of this invention is to provide a means whereby it is made practical to irradiate a target material in the control rods of a nuclear reactor by providing additional material to serve as a source of adequate control rod worth, and yet not compete with the target material for neutrons.

Other objects not specifically set forth will become apparent from the following detailed description made in conjunction with the drawing wherein:

FIG. 1 is a schematic fragmentary perspective of a nuclear reactor control rod in plate form illustrating a control rod configuration of the present invention;

FIG. 2 is a schematic, fragmentary cross section of a hollow cylinder designed for use as a nuclear reactor control rod, this showing illustrating a modification;

FIG. 3 is a schematic, cross sectional plan view of still another control rod configuration falling within the scope of the present invention;

FIG. 4 is a schematic, fragmentary perspective of still another form of control rod of plate-like shape;

FIG. 5 is a schematic, fragmentary section in perspective, illustrating a modification of the rod of FIG. 1;

FIG. 6 is a schematic, fragmentary section in perspective of a reactor core depicting use of a control rod with a special type of control rod follower;

FIG. 7 is a schematic, fragmentary perspective of a modified form of control rod follower;

FIG. 8 illustrates a schematic cutaway of a control rod being used in conjunction with a guide section containing target material; and FIG. 9 is a schematic, fragmentary section in perspective of a telescopic control rod and shim rod structure.

This invention is directed to the use of rare earth materials as well as other materials, such as hafnium, boron, lithium, and cobalt, which exhibit suitable neutron absorbing properties for control rod configuration of the types to be described. Throughout this disclosure, in describing materials only the principal element is named, although various compounds of that substance may be employed. For instance, a description of a control rod configuration might mention the use of gadolinium and boron. In actual practice, it may be intended that the gadolinium be in the form of $Gd_2O_3$ and the boron in the form of $B_4C$. Actually, in many cases, the use of several forms of a substance may be permissible. Furthermore, the poison material may or may not be disbursed in a matrix of some structural material. In any event, it is to be understood that the use of the elemental name of a substance does not imply that it is intended to use the substance in its elemental form in the applications described.

As mentioned earlier, many good epithermal neutron absorbers also have high thermal neutron cross sections.

This is particularly true of rare earth poisons which are a principal subject of this invention. Throughout the rest of this description, these materials will be identified as epithermal absorbers when they are being used as such, although it is to be understood that they may also have even higher thermal cross sections. As has been pointed out, the design of control rods is concerned to a great extent with the nuclear properties of the control rod poisons. Before proceeding with descriptions of the means whereby these poisons might be most effectively used, it seems appropriate to review some of their principal nuclear properties, at least to the extent that they are currently understood.

Boron, in many ways, is an excellent neutron absorber. It has an adequate thermal cross section, and being a $1/v$ absorber, its epithermal worth can be considerable for high surface densities. Furthermore, it is inexpensive and its low atomic weight makes it quite possible to get reasonably high atomic surface densities in a section of relatively small thickness. The principal factor which detracts from the use of boron as a control rod poison is that neutrons are captured by the mechanism:

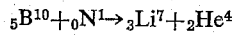

$$_5B^{10} + {_0N^1} \rightarrow {_3Li^7} + {_2He^4}$$

Thus, with each neutron absorbed, a helium atom is produced, so that if a boron control rod is subjected to a very great integrated neutron dose, considerable gas is produced in a small volume.

Hafnium is an extremely effective control rod poison. It has several continuous moderate cross section isotopes, and the metal itself has good corrosion resistance in hot water and adequate strength. Its principal drawback is that it is expensive to produce, and to fabricate.

Silver, cadmium and indium are all potential control rod poisons and alloys of silver, cadmium and indium have been proposed as control rod materials. Among the drawbacks of such alloys, are their high density, expense and lack of adequate creep strength for certain applications.

Cobalt is of interest as a control rod material only because a useful by-product, $Co^{60}$, results from its irradiation. $Co^{60}$ is of considerable use as a radiation source, but neutrons produced especially for the purpose of producing high specific activity $Co^{60}$ would be quite expensive. If $Co^{60}$ of reasonably high specific activity could be produced in control rods or control rod "followers," waste, or at least by-product, neutrons could be used, and inexpensive $Co^{60}$ could be produced. However, a control rod made of Co itself in a satisfactory form would have to be too thick to provide adequate control rod worth. If Co is to be irradiated in control rods, some additional poison must be provided.

Lithium is also of interest as a control rod material because of its conversion to a useful by-product. Tritium is yielded by the reaction: $_3Li^6 + {_0N^1} \rightarrow {_2He^4} + {_1H^3}$. Lithium, due to its chemical and physical properties, would be an impractical control rod material in most systems unless alloyed with or dispersed in some other material. Therefore, its use as a control rod poison depends either upon the use of additional poison, or upon enriching the natural material in the isotope $Li^6$.

Europium is perhaps, at least at first glance, the ideal control rod poison. It has quite a high cross section, a continuous series of reasonably high cross section isotopes, and some excellent epithermal resonances. Thus, europium would appear to be a material capable of high rod worth for a long lifetime. The principal drawback to the use of europium is its expense. At this writing $Eu_2O_3$ costs in the neighborhood of $800.00 per pound, so that in reactors where as much as 1,000 pounds might be required for a set of control rods, its use is prohibitively expensive. Where europium is used as a control rod poison, it will probably be used as sparingly as possible and the control rods will be counted on for quite a long lifetime of service. Should the use of control rods last through several fuel loadings, it would be important that the control rods at the time of the last core loading have a rod worth comparable to that which they had when new. Although europium, due to its series of consecutive high cross section isotopes, does maintain its ability to absorb thermal neutrons, it probably loses considerable rod worth due to the burn-up of $Eu^{151}$. This isotope, being the first of the chain, does burn out and it is probably the largest contributor to europium's epithermal worth due to its resonance cross section of approximately 23,000 b. at approximately 0.5 ev.

In some ways, samarium is similar to europium in that it has an epithermal absorbed with a high thermal neutron cross section. Although $Sm^{149}$ is not nearly as effective as $Eu^{151}$, it is an important epithermal absorber and is probably more responsible than any other isotope for samarium's epithermal worth. Unfortunately, the natural element only contains 13% of the isotope 149, so that it would be burned out quite rapidly, except, of course, for the self-shielding effect of other $Sm^{149}$ atoms. Samarium, unlike europium, does not have a series of consecutive high cross section isotopes, so even this self-shielding effect has a limited duration.

Gadolinium, having a large resonance in the thermal region, has really very little epithermal worth. Gadolinium has over twice the lifetime of samarium, due to the fact that at least 30% of its isotopes have high cross sections. Furthermore, it is suspected that $Gd^{156}$ may also have an appreciable cross section, and if it does, the lifetime of gadolinium will be approximately trebled. Because of this uncertainty, gadolinium, in the description which follows, will be identified in certain instances as a poison to protect, while at other times it will appear as a protecting poison.

Dysprosium, like europium, has a series of continuous high cross section isotopes, and considerable epithermal worth. While the starting cross section is not nearly as high as that of europium, the rate of burn-up of dysprosium is somewhat slower than that for europium, given the same original product of macroscopic cross section and thickness. Therefore, dysprosium is capable of experiencing a rather large integrated neutron dose before losing its effectiveness, but much greater surface densities are required than for europium if it were to be subjected to comparable irradiation. The big advantage to using dysprosium instead of europium is that its cost is much less (approximately $50.00 per pound at this writing for $Dy_2O_3$).

Erbium is an excellent example of an epithermal poison which has a relatively low thermal neutron cross section, so that even if it were near the surface, there would be much less concern that its effectiveness would be substantially decreased due to burn-up by thermal neutrons.

In line with the objects of the present invention, the arranging of rare earths or other poisons of similar properties in stratified relation in control rod fabrication can provide for longer control rod life and usefulness, than if the same materials are hemogeneously or are randomly mixed. In combining the useful properties of europium and dysprosium, the concentration of europium in the center of the rod with the dysprosium serving as a protective shield establishes an over-all higher neutron cross section for a longer period of time by protecting the europium which is a more rapidly burnable poison. As further illustrative, a high cross section resonance absorber, such as $Eu^{151}$ or $Sm^{149}$, can be shielded to absorb a much lower percentage of thermal neutrons. In this respect, dysprosium may be used to shield the europium or samarium to thereby extend the useful life of europium or samarium as epithermal absorber. Similarly, if gadolinium is used as a thermal neutron shield, the epithermal usefulness of both samarium and europium is extended considerably over the usefulness of these materials, either in unshielded or mixed condition. Boron, which exhibits a useful epithermal absorption cross section, may be provided with increased usefulness as an epithermal poison by protectively shielding the same with a thermal neutron absorber, such as gadolinium, to thus decrease gas production by preventing the absorption of thermal neutrons in boron.

Specific techniques by which the specially constructed control rods of the present invention are formed are not an object of this invention. There are several practical means of fabricating control rods of the configuration described hereinafter, including co-extrusion of matrix and cladding, the poison being mixed with the structural material of the matrix; a plate and frame technique whereby the frame serves as a structure for the poison which may have no strength of its own; and others.

Illustrative control rod configurations incorporating the principles of the present invention are set forth in the accompanying drawing. FIG. 1 illustrates a rod 10 of plate form provided with a central layer or core 11 of epithermal neutron absorptive material such as, for example, samarium, europium, boron, or a mixture of samarium and europium, or perhaps even compounds of samarium or gadolinium and boron. On each side of the central layer 11 is a discrete layer 12 of an inexpensive shielding or thermal neutron absorbing material such as, for example, gadolinium or dysprosium. The outer surfaces of the rod 10 are covered with a corrosion protective cladding in the form of metal sheets 13 which may be aluminum, zircalloy, stainless steel, or whatever is appropriate for the particular coolant. The rod 10 is utilized in a nuclear reactor in the conventional manner with the same being raised or lowered relative to the pile to provide for the desired degree of reactivity control. Thermal neutrons are absorbed virtually solely by the shielding layers of gadolinium, or principally in dysprosium if that is used, and the high cross section material of the core 11 is protected against excessive burn-up and used primarily for epithermal neutron absorption, at least until later in the life of the control rod.

The thickness of the various layers of absorptive materials may vary appreciably with the various materials used and with the flux density of a given reactor. It will be appreciated, however, that proper selection of the neutron absorbers, resulting in long life, must be such as to remain within the control rod thickness permitted in a given reactor.

Another control rod configuration is illustrated in FIG. 2 wherein a hollow cylinder 14 is formed from a discrete core 15 of epithermal absorptive material surrounded by a discrete layer 16 of thermal neutron absorptive material. Here again, both the outer and inner surfaces of the rod 14 are provided, as is usually necessary, with a corrosion protective cladding 17. By way of example, the rod 14 may include an inside layer 15 of gadolinium, europium, samarium, or boron shielded by a layer 16 of dysprosium, or in some cases, gadolinium.

FIG. 3 illustrates a box-shaped control rod 18 of the type particularly adapted for use in reactors having an extremely hard spectrum. The rod annulus, generally designated by the numeral 19, is filled with moderator, such as water or other hydrogeneous coolants, to decrease neutron velocity inside the box. If the ratio of epithermal to thermal neutrons in the reactor is high enough, it can prove worthwhile to shield a poison such as gadolinium with a slower burning one, such as dysprosium, from the higher thermal flux coming from inside the box. Thus, a layer of dysprosium 20 shielding a layer of gadolinium 21 could provide for considerably longer life than if gadolinium were used alone. The inner and outer surfaces of the rod 18 would also be preferably provided with corrosion protective cladding 22 and 23, respectively. As illustrated, the shielding layer 20 may be substantially thicker than the higher cross section layer 21 with the extent of thickness differential depending upon the hardness of the flux of a given reactor.

FIG. 4 illustrates a control rod plate 24 particularly designed for use in fast reactors, including a fast reactor core 25 (fuel without moderator) separated from a thermal blanket or reflector 26 (fuel or fertile material, or both, plus moderator) by the plate 24. This plate includes an inner layer 27 of europium or boron and gadolinium shielded on the outside by a thicker layer 28 of dysprosium. Inside and outside cladding 29 and 30 will probably be required. In fast reactors of this type the dysprosium layer 28 serves as the basic heavy duty neutron absorber. The gadolinium serves as a thermal neutron scavenger to prevent thermal neutrons from returning into the core 25 where they would create local hot spots. As it is also desirable to remove as many of the epithermal neutrons as possible, europeum or boron is also included in the inner layer 27.

It may be desirable under suitable circumstances to incorporate the shielding poison into the structural or cladding material, particularly if the poison being shielded has little structure value. FIG. 5 depicts such a modification wherein the rod 31 contains a poison such as $B_4C$, identified by the numeral 32, shielded by a structural material 33, such as Hf, or a Gd-steel alloy.

Materials such as natural lithium and its alloys or compounds, and cobalt and its alloys or compounds may be effectively irradiated in control rods by providing them with a core of a more effective neutron poison. $Co^{60}$, for example is an excellent source of ionizing radiation but production costs have been so great that industrial use of this source has been discouraged.

For example, the rod 10 of FIG. 1 may be formed with a core 11 of high cross-section neutron absorber material, such as gadolinium, boron, or europium, and the outer layers 12 formed from cobalt or lithium or one of their compounds or alloys. The presence of the gadolinium or europium supplies the requisite removal cross-section to the rod 10 and the relatively transparent lithium or cobalt may still be irradiated efficiently, using neutrons which must be absorbed anyway. Note that the neutrons pass through the cobalt or lithium before being exposed to the more effective poison, thereby resulting in exposure of the target material to a higher neutron current than would otherwise be the case. Furthermore, the thickness of the cobalt or lithium layer need not be excessive as its greyness is overcome by the presence of the black core. Thus it is possible to realize a reasonably high specific activity source, provided the flux is high enough.

Actually $Co^{60}$ of a higher specific activity can be produce by irradiating the Co in control rod followers. In some reactors which are moderator cooled, a low cross-section piece in the shape of the control rod is attached to the bottom of the rod so that when the rod is withdrawn the gap is not filled with moderator. FIG. 6 is a schematic showing of a control rod 34 provided with a follower 35, the rod partially withdrawn from the reactor core 36. The purposes of control rod follower 35 is to prevent neutron moderation in the otherwise empty control rod channel 37 and the thermal flux peaking which would result at the fuel pates 38 closest to the channel.

Another effective way, and one no more wasteful of neutrons, is to use thin strip plate followers 39 containing some suitable poison compounded therein, but with considerable space in the rod channel 40 for moderator as shown in FIG. 7. This arrangement provides for some moderation of epithermal neutrons in the control rod channel 40, so that the thermal neutron flux would tend to be significantly higher in the channel than in the fuel element. However, the lightly poisoned follower strips 39 remove most of the excess neutrons thereby decreasing the flux peaking effect.

Rod followers of the type described produce an isotope of higher specific activity than the control rods mentioned above, but they require more "head room" than rods without followers. A modification in control rod design makes it feasible to have a movable control rod 41 of high cross-section poison received within an outer fixed guide section defined by plates 42 such as that shown in FIG. 8. From the standpoint of $Co^{60}$ or $H^3$ production, the guide section plate material contains cobalt or lithium which is irradiated regardless of whether the rod 41 is in or out of the pile although the flux at the target material containing plates 42 will be considerably higher when the rod is out.

One example of still another variation which can be particularly effective is shown in FIG. 9. A control rod 43 is placed outside a "shim" rod 44 containing enough target material to have appreciable rod worth. The control rods are withdrawn to start up the reactor, and the less effective rods are manipulated to effect shimming. In this way the reactor designer may shim his reactor with a useful and mild poison, yet have high rod worth when he needs it. The shim poison can also be placed externally to the control rod if that is considered preferable in a particular reactor.

While the foregoing description of the present invention has dealth with control rods of any suitable shape, it will be understood that certain modifications of the present invention may be practiced without departing from the scope thereof as set forth in the appended claims.

I claim:

1. A control rod for nuclear reactors comprising a core of boron containing material covered by a neutron absorbing layer of material selected from the group consisting of samarium, gadolinium, erbium, dysprosium, and europeum.

2. A control rod for nuclear reactors comprising a layer of hafnium metal enclosing a core which contains neutron absorbed material selected from the group consisting of samarium, gadolinium, erbium, dysprosium, and europium.

3. A control rod for nuclear reactors comprising a core of neuron absorbing material having a high cross-section for thermal and epithermal neutrons, covered by a layer of a different neutron absorbing material having a high cross-section for thermal neutrons and a lower cross-section for epithermal neutrons than that of said core material.

4. A control rod for nuclear reactors comprising a core of high cross-section neutron absorbing material covered by a layer of neutron absorbing material which contains cobalt subject to conversion to radiation source isotopes as a result of neutron absorption thereby, and a corrosion protective cladding covering the exposed surfaces of said rod.

5. A control rod for nuclear reactors comprising a core of high cross-section neutron absorbing material covered by a layer of neutron absorbing material which contains lithium subject to conversion to radiation source isotopes as a result of neutron absorption thereby, and a corrosion protective cladding covering the exposed surfaces of said rod.

6. A control rod for nuclear reactors comprising a neutron absorbing core of samarium covered by a neutron absorbing layer of dysprosium.

7. A control rod for nuclear reactors comprising a core of boron containing material covered by a neutron absorbing layer of material having a microscopic cross section for thermal neutrons which is substantially higher than that of boron.

8. A control rod for nuclear reactors comprising a neutron absorbing core of europium covered by a neutron absorbing layer of gadolinium.

9. A control rod for nuclear reactors comprising a neutron absorbing core of samarium covered by a neutron absorbing layer of gadolinium.

10. A control rod for nuclear reactors comprising a neutron absorbing core of a mixture of europium and samarium covered by a neutron absorbing layer of gadolinium.

11. A control rod for nuclear reactors comprising a neutron absorbing core of europium covered by a neutron absorbing layer of dysprosium.

12. A control rod for nuclear reactors comprising a neutron absorbing core of gadolinium covered by a neutron absorbing layer of dysprosium.

References Cited in the file of this patent

UNITED STATES PATENTS

| 2,852,460 | Abbott et al. | Sept. 16, 1958 |
| 2,866,741 | Hausner | Dec. 30, 1958 |
| 2,920,204 | Youmans | Jan. 5, 1960 |

OTHER REFERENCES

Glasstone: Principles of Nuclear Reactor Engineering, D. Van Nostrand Co., Princeton, 1955, pp. 101–103.

Nucleonics, vol. 15, No. 1, January 1957, pp. 44–46.

"A Glossary of Terms in Nuclear Science and Technology," American Society of Mechanical Engineers, 1957; pp. 35, 169.